United States Patent [19]
Igarashi et al.

[11] Patent Number: 5,540,815
[45] Date of Patent: Jul. 30, 1996

[54] METHOD OF RECYCLING AN IMAGE CARRYING MEDIUM AND AN IMAGE SEPARATING MEMBER THEREFOR

[75] Inventors: Masato Igarashi; Toshiyuki Kawanishi; Eiichi Kawamura; Narihito Kojima, all of Numazu, Japan

[73] Assignee: Ricoh Company, Ltd., Tokyo, Japan

[21] Appl. No.: 352,617

[22] Filed: Dec. 9, 1994

[30] Foreign Application Priority Data

Dec. 10, 1993 [JP] Japan .................................. 5-310348
Dec. 17, 1993 [JP] Japan .................................. 5-318101

[51] Int. Cl.$^6$ ............................................. D21C 5/02
[52] U.S. Cl. ........................... 162/5; 162/4; 118/106; 118/116
[58] Field of Search ........................ 162/4, 5, 265; 355/202, 297, 308; 156/281; 118/263, 249, 59, 104, 116, 106, 202, 108, 121, 119, 122; 15/77

[56] References Cited

FOREIGN PATENT DOCUMENTS

| 0639803A2 | 2/1995 | European Pat. Off. . |
| 7129045 | 5/1994 | Japan . |
| 7-121073 | 5/1995 | Japan . |
| 7121069 | 5/1995 | Japan . |
| 7-121068 | 5/1995 | Japan . |

*Primary Examiner*—Brenda A. Lamb
*Attorney, Agent, or Firm*—Oblon, Spivak, McClelland, Maier & Neustadt, P.C.

[57] ABSTRACT

A method of recycling a copy sheet carrying a hydrophobic image thereon by impregnating the sheet with a water-containing separating liquid, causing the to image contact an image separating member, and heating the sheet for thereby transferring the image to the image separating member. The image separating member has a critical surface tension of 25 mN/m or above.

13 Claims, 4 Drawing Sheets

METHOD OF RECYCLING AN IMAGE CARRYING MEDIUM AND AN IMAGE SEPARATING MEMBER THEREFOR

BACKGROUND OF THE INVENTION

The present invention relates to a method of recycling a medium carrying an image printed in thermo-softening ink by removing the image from the medium, and an image separating member therefor. More particularly, the present invention is concerned with a method of recycling a copy sheet by separating a toner image therefrom, and an image separating member therefor.

Today, a tremendous number of sheets are used in offices for printing and copying purposes and has invited the disruption of global environment due to lumbering. It has been customary to recycle or regenerate used sheets by removing ink from them, melting them down, and then making fresh sheets. A recent achievement in the resource saving art is a method capable of removing character images from used sheets by cleaning so as to recycle them for printing and copying purposes. This kind of method is disclosed in the following documents (1)–(3) by way of example.

(1) Japanese Patent Laid-Open Publication Nos. 4-64472 & 4-67043

Methods taught in these documents apply a silicone seal agent or similar parting agent to the surface of a fresh sheet and then dry it to produce a reusable or erasable sheet. An image is formed on the surface of the sheet carrying the parting agent thereon. To recycle the sheet, thermo-fusible resin, or toner resin for forming an image, is adhered to the sheet in order to remove the image. Such a method, however, brings about the following problems (i)–(v).

(i) An image is formed on the parting agent and cannot, of course, be stably fixed on the sheet.

(ii) Since the image is mechanically stripped off from the sheet by the toner resin while the sheet is heated, the toner resin penetrated into the fibers of the sheet cannot be fully removed. Hence, the recycling efficiency is extremely low.

(iii) Duplex copying, i.e., reproducing an image on both sides of a single sheet is important from the resource recycling standpoint and will become predominant in the future. In this respect, applying the parting agent to only one side of a sheet is not efficient.

(iv) Even if the parting agent is applied to both sides of a sheet and then dried, the silicone seal agent will penetrate into the sheet and render the resulting sheet semitransparent. Images reproduced on both side of such a sheet will be illegible.

(v) The erasable sheets should be distinguished from plane sheets in the event of copying, further lowering efficiency. It is difficult to stack the erasable papers together with plane papers and reproduce images thereon.

(2) Japanese Patent Laid-Open Publication Nos. 1-101576 & 1-101577

A medium carrying an image thereon is immersed in an organic solvent which dissolves toner resin constituting the image. Then, the medium is treated by supersonic waves to remove the image. The problem with this method is that a great amount of organic solvent is required in order to dissolve and remove the toner resin. This not only increases the overall size of a processing apparatus but also gives rise to other various problems including the regeneration of the solvent, inflammability, toxicity and environmental pollution. Therefore, this kind of procedure is not feasible for offices and homes.

(3) Japanese Patent Laid-Open Publication No. 1-297294

The image carrying medium is implemented as a sheet of plastic, metal, paper with low liquid infiltration or ceramic. An image formed on the medium is heated with the intermediary of a thermo-fusible image separating member. As a result, the image is stripped off from the medium. This cleaning method, however, needs a special sheet, or erasable paper, whose surface is treated for parting and is not applicable to ordinary sheets used in a great amount for copying and printing.

SUMMARY OF THE INVENTION

It is, therefore, an object of the present invention to provide a method of recycling an image carrying medium by fully removing an image printed in thermo-softening ink, and an image separating member therefor.

It is another object of the present invention to provide a method capable of recycling a copy sheet by fully separating a toner image therefrom, and an image separating member therefor.

In accordance with the present invention, a method of recycles a copy sheet carrying a hydrophobic image thereon by impregnating the sheet with a water-containing separating liquid, causing the image to contact an image separating member, and heating the sheet for thereby transferring the image to the image separating member. The image separating member has a critical surface tension of 25 mN/m or above.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
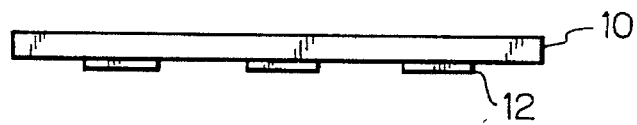
FIGS. 1–4 are views demonstrating the principle of the present invention.
Figure 2:
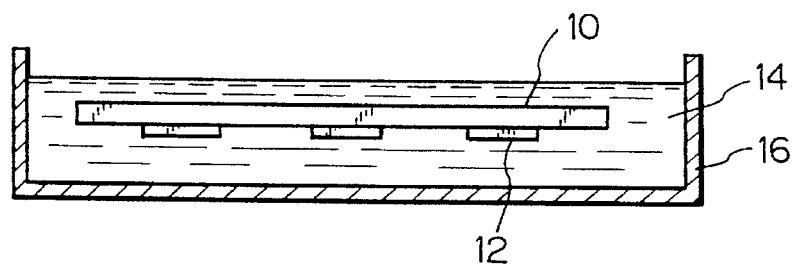
Figure 3:
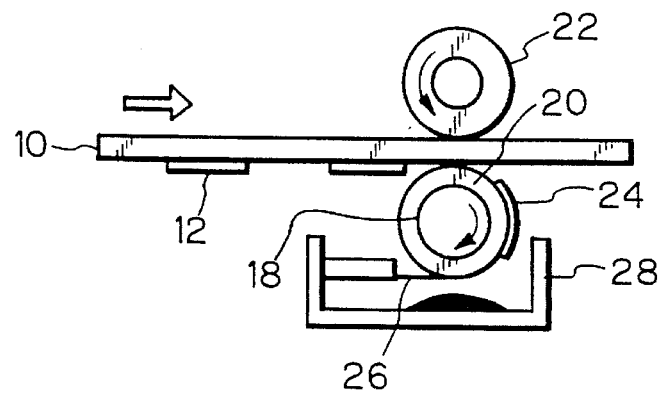
Figure 4:
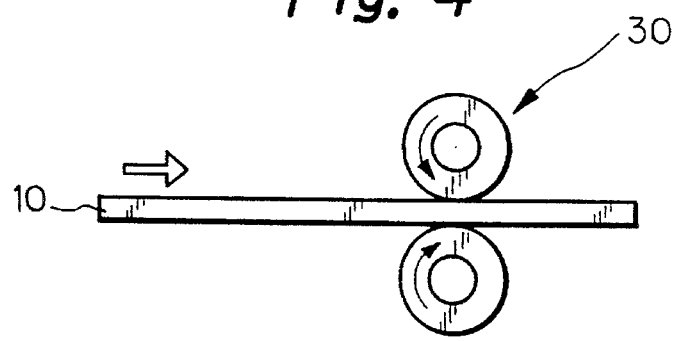

Referring to FIGS. 1–4, the principle of the present invention will be described. FIG. 1 shows a medium, or printing, on which an image is formed in thermo-softening ink by an electrophotographic process. FIG. 2 shows the medium 10 immersed in a separating liquid 14 stored in a vessel 16. The separating liquid 14 weakens the bond between the medium 10 and the image or ink 12. As shown in FIG. 3, an image separator in the form of a roller 18 is provided with a separating layer 20 on the surface thereof. The medium 10, brought out of the vessel 16, is conveyed to between the separator roller 18 and a press roller 22. When the ink 12 is pressed against the layer 20 of the roller 18 by the roller 22, the former is transferred to the latter with the result that the medium 10 is erased. As the separator roller 18 is rotated, a blade 26 scrapes off the ink, labeled 24 in FIG. 3, from the surface of the roller 18. The ink 24 removed from the roller 18 is collected in a container 28. As shown in FIG. 4, the erased medium 10 is passed through between a pair of heat rollers 30 so as to evaporate the separating liquid. As a result, the medium 10 is dried and recycled.

Generally, the composition of the thermo-softening ink and the material of the medium each varies over a broad range. In accordance with the present invention, the separating liquid and the separating material provided on the separator roller 18 are selected in matching relation to the ink and medium. While the major component of the ink is usually styren-acryl, polyester or similar synthetic resin, natural wax or synthetic wax, the deposition of such ink on the medium and separating material also depends on dyes and other additives contained in the ink. The medium is generally implemented as a paper whose major component is cellulose fibers, or a film of polyester, acetate, polycarbonate or similar plastic. As for a paper, the deposition of the ink on the medium and separator depends even on the composition and structure, e.g., the length and thickness of cellulose fibers, the surface, and the kind and amount of a sizing.

Regarding the separating liquid, we found that water, ethanol or a mixture thereof is desirable from the safety and cost standpoint, and that the content of such a substance in the entire composition should preferably be 70 Wt % or above. We also found that the separating liquid, or solvent, should preferably contain a surface active agent or a high molecular compound soluble to the solvent in order to cope with various kinds of ink compositions and various kinds of recording media. Particularly, when the major component of the medium is fibers, as is the case with ordinary papers, the bond between the ink or image and the medium is noticeably reduced. For a plastic film, it is preferable to use ethanol or a water and ethanol mixture.

The image separator in accordance with the present invention is implemented by a material in the form of a sheet and adhesive to an image. The image separator has a surface whose critical surface tension is 25 mN/m or above. Critical surface tensions less than 25 mN/m would lower the adhesion of the image separator to toner (whose critical surface tension is about 35 mN/m) usually used for image formation, thereby preventing an image from being fully transferred from the medium to the image separator. Typical of organic high molecular substances having a critical surface tension of 25 mN/m or above are polyethyrene terephthalate, polybutylene terephthalate, polyethyrene naphthalate, plolypropylene, polystyrene, acrylic resin, methacrylic resin, epoxy resin, and polycarbonate resin.

The image separator in accordance with the present invention may have a thermal deformation temperature of 80° C. or above and may have a surface with a hard layer of carbon.

Figure 5:
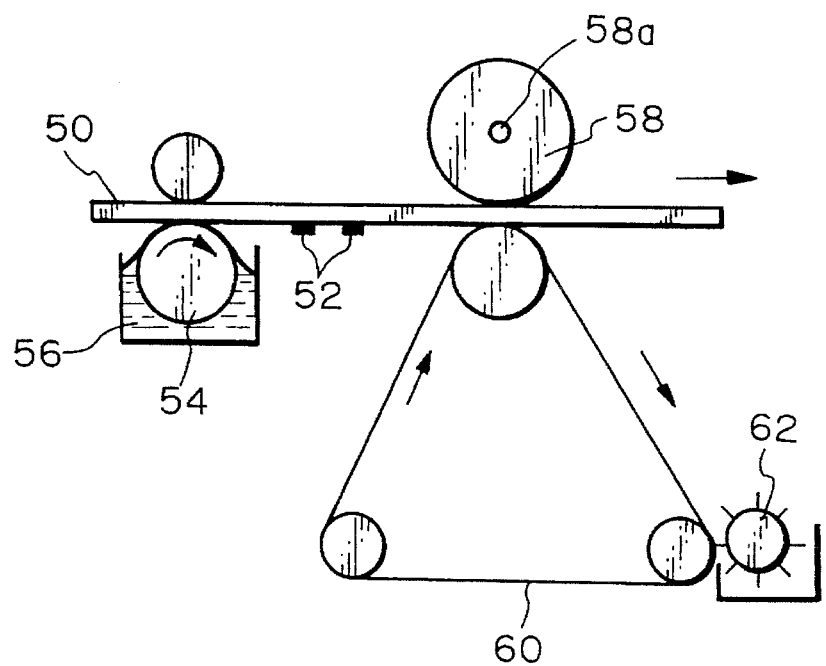
FIGS. 5–7 are views each showing a specific arrangement for practicing a method of the present invention.

FIG. 5 shows a specific arrangement for practicing the method of the present invention. As shown, a printing or copy sheet 50 carrying an image formed by toner 52 is brought into contact with a wetting roller 54 which is partly immersed in a separating liquid 56. As a result, the copy sheet 50 is impregnated with the separating liquid 56. Then, the copy sheet 50 is conveyed to between a support roller 58, having a heater 58a therein, and an image separator implemented as a belt 60. While the copy sheet 50 is heated by the support roller 58, the toner 52 is brought into contact with the belt 60. As a result, the toner 52 is transferred from the copy sheet 50 to the belt 60, i.e., the sheet 50 is erased and recycled. The toner transferred to the belt 60 is removed and collected by a cleaning unit 62.

Figure 6:
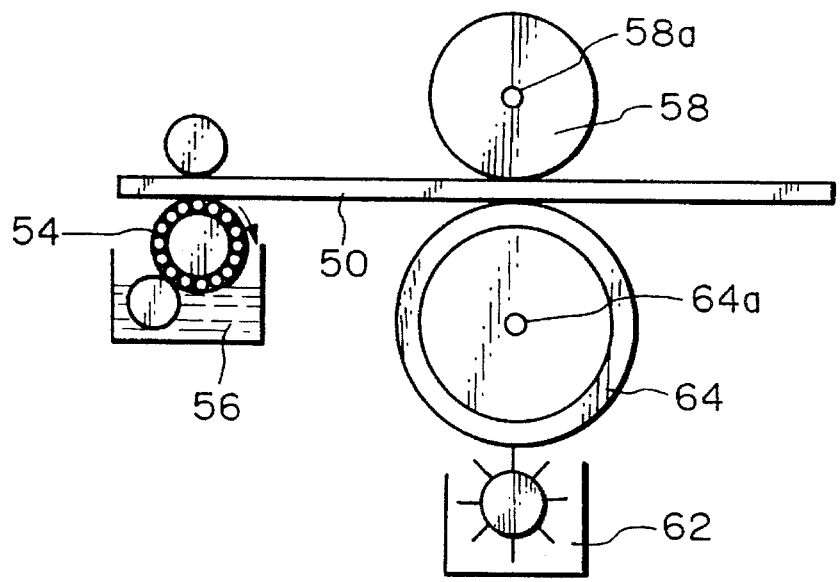

Another specific arrangement with which the present invention is practicable is shown in FIG. 6. As shown, the illustrative arrangement is identical with the arrangement of FIG. 5 except that the image separator or separating member is implemented as a roller 64 having a heater 64a therein.

Figure 7:
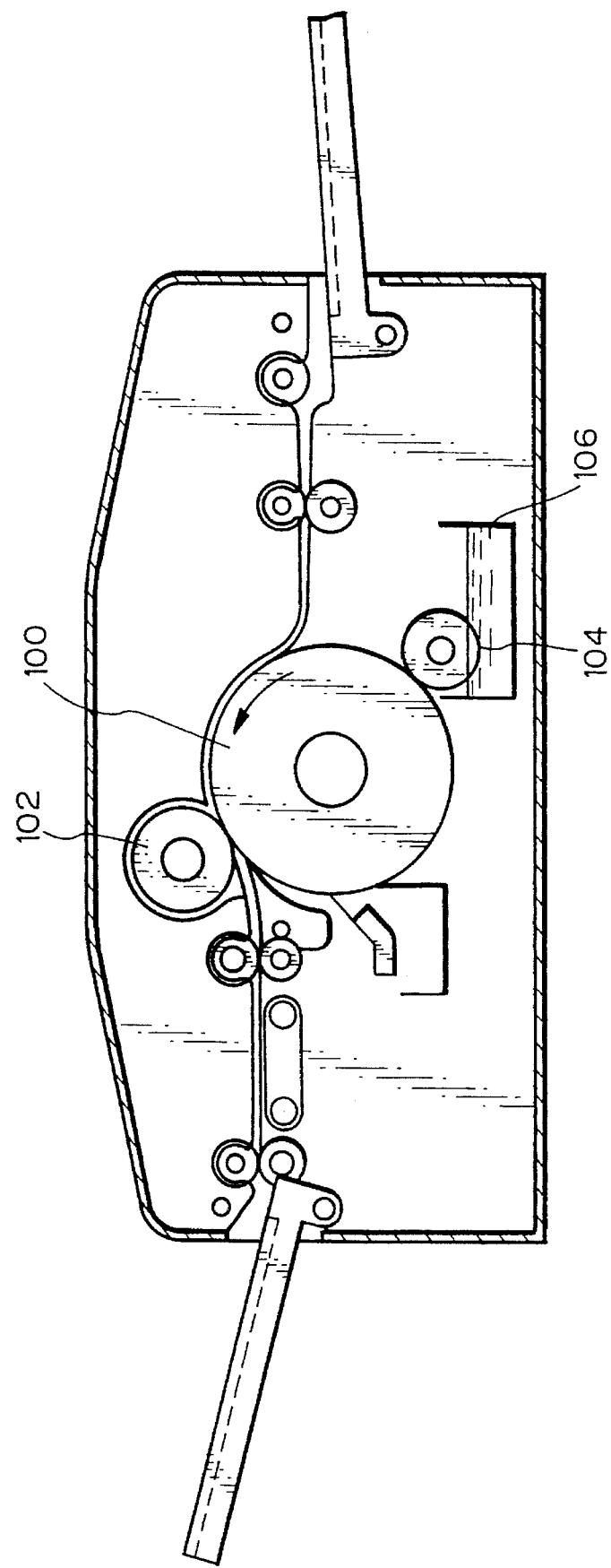

FIG. 7 shows still another specific arrangement for practicing the method of the present invention. As shown, an image separator roller 100 is held in contact with a heat roller 102. A separating liquid 106 is fed to the roller 100 by a liquid supply roller 104.

Figure 8:
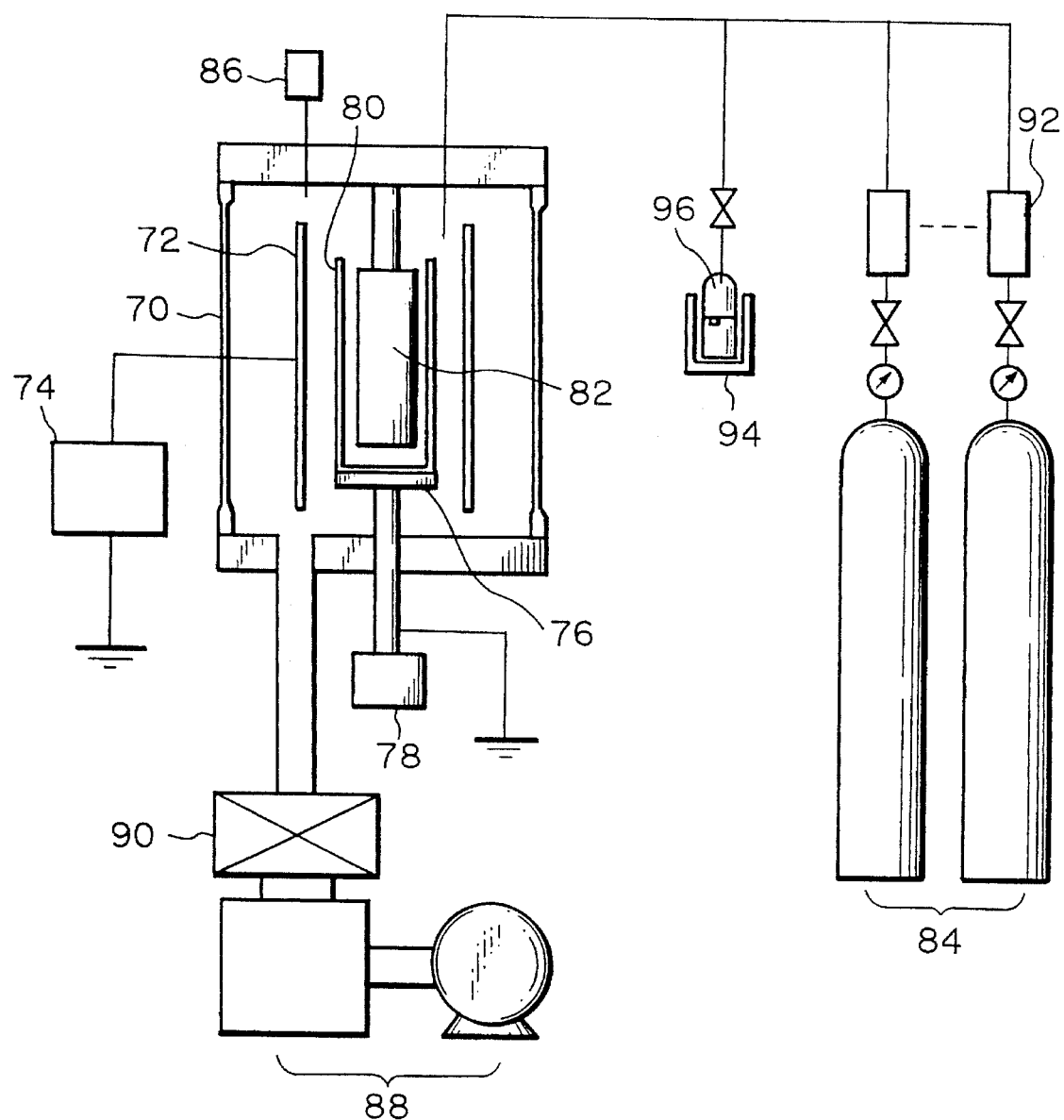
FIG. 8 shows a specific construction of a plasma chemical vapor deposition (CVD) apparatus.

Referring to FIG. 8, a specific construction of a plasma CVD apparatus. As shown, the CVD apparatus has a vacuum chamber 70 accommodating a counter electrode 72. The counter electrode 72 is connected to a high frequency power source 74. A mandrel 76 is disposed in the vacuum chamber 70 and rotated by a motor 78. An object 80 to be treated is mounted on the mandrel 76 so as to form a hard layer thereon. Gases necessary for the formation of a hard layer are fed from a group of gas cylinders 84 to the vacuum chamber 70 with the object 80 being or not being heated. Power is applied from the high tension power source 74 to the counter electrode 72. A vacuum gauge 86, a vacuum pump 88 and an exhaust valve 90 for exhaust and pressure control are associated with the vacuum chamber 70. The gases from the cylinders 84 are admitted into the vacuum chamber 70 via a flow meter 92. A volatile organic compound is stored in a container 96 which is contained in a thermostatic receptacle 94. Such a compound is fed to the vacuum chamber 70 in a controllable amount.

Examples of the method in accordance with the present invention will be described hereinafter.

EXAMPLES 1–4

In each of Examples 1–4, an image was formed on a copy sheet by an ordinary PPC copier (FT6960 available from Ricoh). The copy sheet was immersed in a separating liquid containing water, and then the image surface of the sheet was brought into contact with an image separator implemented as a 100 Mm thick film. In this condition, the copy sheet was heated to about 980° C. by a heat roller. Subsequently, the copy sheet was separated from the image separator. Examples 1–4 were executed under the conditions shown in Table 1 below. After the separation of the copy sheet from the image separator, the sheet was evaluated as to the remaining pieces of ink by eye in ten grades. A sheet with a smaller number of remaining pieces of ink was given a higher grade; a sheet comparable with a fresh sheet was given ten points.

TABLE 1

| Ex. & Comp. Ex. | Image Separator | Critical Surface Tension (mN/m) | Thermal Deform. Temp. (°C.) | Evaluation |
| --- | --- | --- | --- | --- |
| Ex. 1 | polypropylene | 29 | 100 | 6 |
| Ex. 2 | polystyrene | 33 | 90 | 7 |
| Ex. 3 | polymethyl methacrylate | 39 | 100 | 7 |
| Ex. 4 | polyethylene terephthalate | 43 | 140 | 7 |
| Comp. Ex. 1 | polytetrafluoroethylene | 18 | 120 | 2 |
| Comp. Ex. 2 | polydimethyl siloxane | 24 | 180 | 3 |
| Comp. Ex. 3 | polyfluoroethylene propylene | 22 | 150 | 3 |

As Table 1 indicates, with Examples 1–4, it is possible to sufficiently separate a thermo-softening toner image from a copy sheet or similar medium and use the sheet again.

EXAMPLE 5

An endless belt made of polyethyrene terephthalate (PET) was set on the mandrel 76, FIG. 8. After evacuation, a hard layer or film whose major component was carbon was formed on the endless belt as a surface protection layer, under the following conditions:

| | |
| --- | --- |
| Exhaust pressure before film formation: | lower than $2 \times 10^{-5}$ |
| Flow rate of $C_2H_4$: | 100 sccm |
| Flow rate of $H_2$: | 2:00 sccm |
| Reaction pressure: | .01 torr |
| High frequency power (13.56 MHz): | 100 W |
| Bias voltage: | 10 V |

The film forming time was controlled to form a 2 μm thick protection layer on the PET endless belt, thereby producing an image separator. When the endless belt or image separator was mounted on the apparatus shown in FIG. 5, it successfully recycled 2,000 consecutive copy sheets. The endless belt had a critical surface tension of 35 mN/m and deformed when heated to above 200° C.

EXAMPLE 6

Example 5 was repeated except for the following. A hard layer consisting of $C_2H_4$ and $NF_3$ was formed on an aluminum drum whose surface was covered with resin, under the following conditions:

| | |
| --- | --- |
| Exhaust pressure before film formation: | lower than $2 \times 10^5$ |
| Flow rate of $C_2H_4$: | 100 sccm |
| Flow rate of $H_2$: | 200 sccm |
| Flow rate of $NF_3$: | 50 sccm |
| Reaction pressure: | 0.02 Torr |
| High frequency power (13.56 MHz): | 100 W |
| Bias voltage: | −10 V |

When the drum was mounted on the apparatus shown in FIG. 6, it successfully regenerated 3,000 consecutive copy sheets. The drum had a critical surface tension of 38 mN/m and deformed when heated to above 200° C.

The hard layer on the image separator produced by Example 5 or 6 has a Vickers hardness of as high as 100 kg/mm² to 3,000 kg/mm². Such a hard layer suffers from a minimum of deterioration due to wear and scratches which are attributable to a cleaning section, so that the image separator is durable. The image separator with the hard layer can be implemented as an endless belt or a drum, as desired. Table 2 shown below lists the results of evaluation of Examples 5 and 6.

TABLE 2

| Ex. | Image Separator | Critical Surface Tension (mN/m) | Thermal Deform. Temp. (°C.) | Evaluation |
| --- | --- | --- | --- | --- |
| 5 | Co-containing Surface Layer (5) | 35 | 200 or above | 8 |
| 6 | Co-containing Surface Layer (6) | 38 | 200 or above | 8 |

EXAMPLES 7–12

An image was formed on a PPC sheet (Type 600 available from Ricoh) by an ordinary copier (FT4525 also available from Ricoh). The copy sheet was immersed in a separating liquid which consisted of 99.5% of pure water and 0.5% of Nonion-based surface active agent (BT-7 available from Nikko Chemicals). Subsequently, the copy sheet was conveyed to between the separator roller 100 and the heat roller 102, FIG. 7, so as to separate the image. The heat roller 102 had the surface thereof heated to 90° C. while the copy sheet was fed at a rate of 20 mm/sec. Examples 7–12 were conducted and evaluated, as listed in Table 3 below.

TABLE 3

| Ex. | Image Separator | Critical Surface Tension (mN/m) | Thermal Deform. Temp. (°C.) | Evaluation |
| --- | --- | --- | --- | --- |
| 7 | polyethyrene naphthalate | 40 | 160 | 8 |
| 8 | PET with $T_iO_2$ | 44 | 150 | 8 |
| 9 | PET with $S_iO_2$ | 45 | 150 | 8 |
| 10 | Al-vaporized PET | 35 | 200 or above | 7 |
| 11 | sand-blasted Al drum | 50 | 200 or above | 6 |
| 12 | Ni belt | 30 | 200 or above | 7 |

In Examples 7–12, PET contains about 30% of $TiO_2$ or $SiO_2$. Such a composition provides the image separator with a critical surface tension and thermal deformation temperature slightly higher than those available with PET alone. The surface of aluminum-evaporated PET is partly oxidized, so that the critical surface tension is lower than that of metal alone.

Various modifications will become possible for those skilled in the art after receiving the teachings of the present disclosure without departing from the scope thereof.

What is claimed is:

1. A method of recycling an image carrying medium carrying a hydrophobic image thereon comprising the steps of impregnating said image carrying medium with a water-containing separating liquid, causing said hydrophobic image to contact an image separating member, and heating said image carrying medium to transfer said hydrophobic image to said image separating member, wherein said image separating member has a critical surface tension of 25 mN/m or above and a thermal deformation temperature of 80° C. or above.

2. A method as claimed in claim 1, wherein said image separating member has a surface formed of an organic polymer having a critical surface tension of 25 mN/m or above.

3. The method of claim 2, wherein said organic polymer is selected from the group consisting of polyethylene terephthalate, polybutylene terephthalate, polyethylene naphthalate, polypropylene, polystyrene, acrylic resin, methacrylic resin, epoxy resin, and polycarbonate resin.

4. A method as claimed in claim 1, wherein said image separating member has on a surface thereof a hard layer of carbon or of a composition whose major component is carbon.

5. A method as claimed in claim 1, wherein said image separating member comprises a belt or a drum.

6. A method as claimed in claim 1, wherein said image separating member has a thermal deformation temperature of 90° C. or above.

7. A method as claimed in claim 1, wherein said image separating member contains titanium oxide.

8. A method as claimed in claim 1, wherein said image separating member contains silicon oxide.

9. A method as claimed in claim 1, wherein said image separating member is made of metal or a metal-containing compound.

10. A method as claimed in claim 1, wherein said image separating member is made of silicon dioxide and polyethylene terephthalate, titanium dioxide and polyethylene terephthalate, nickel, aluminum, polyethylene terephthalate or aluminum vaporized on polyethylene terephthalate.

11. The method of claim 1, wherein the hydrophobic image comprises thermo-softening ink.

12. The method of claim 1, wherein the hydrophobic image comprises toner.

13. The method of claim 1, wherein said separating liquid is water, ethanol, or a mixture thereof, optionally containing a surface active agent.

* * * * *